Figure 1:
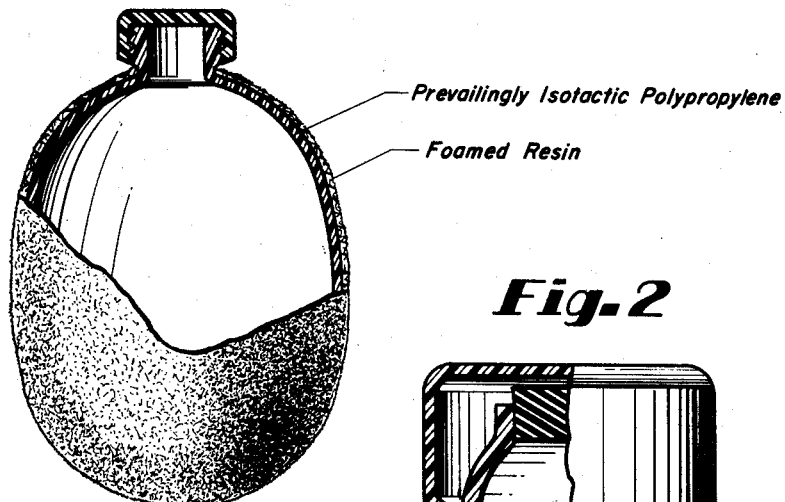

Dec. 18, 1962    P. MUSSO ETAL    3,069,041
THERMOS CONTAINER AND METHOD FOR MAKING
Filed Oct. 10, 1957    2 Sheets-Sheet 1

— Prevailingly Isotactic Polypropylene
— Foamed Resin

Prevailingly Isotactic Polypropylene
Foamed Resin

INVENTORS
POMPILIO MUSSO
GIUSEPPE GUZZETTA

BY *Taulmin & Taulmin*

ATTORNEYS

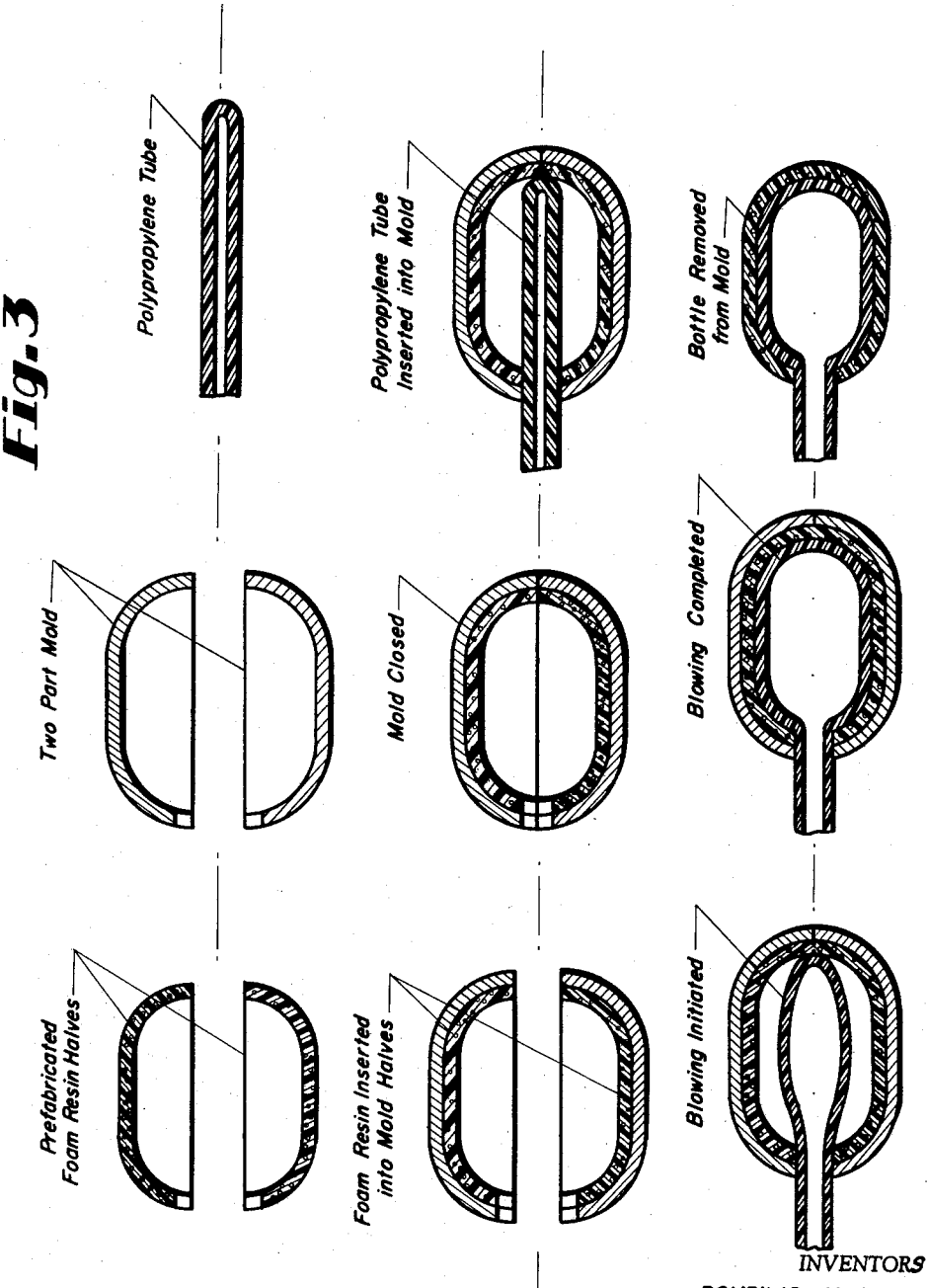

United States Patent Office 3,069,041
Patented Dec. 18, 1962

3,069,041
THERMOS CONTAINER AND METHOD
FOR MAKING
Pompilio Musso and Giuseppe Guzzetta, Milan, Italy, assignors to Montecatini Societa Generale per l'Industria Mineraria e Chimica, Milan, Italy
Filed Oct. 10, 1957, Ser. No. 689,343
Claims priority, application Italy Oct. 17, 1956
3 Claims. (Cl. 220—9)

This invention relates to plastic containers for foods, liquids and other materials, and to methods for making the containers. More particularly, the invention is concerned with plastic, thermally insulated containers in which substances are maintained for long periods of time at the temperature at which they are introduced into the containers.

Containers made of plastic materials are known and have been used for various purposes. However, even the containers made from the best thermoplastic resins available heretofore have serious drawbacks which curtail their utility and resulting, for the most part, from the poor thermal resistance of the resins from which the containers are made. The first and most serious disadvantage is the fact that, as is known, the plastic containers which have been commercially available cannot be subjected safely to temperatures higher than about 60° C. A second, not less serious disadvantage of the available containers, is that the thermoplastic resins from which the containers have been made show a remarkable increase in impact brittleness at temperatures below 0° C. These known thermally insulating containers made from the currently best available resins necessarily mean that the containers have only a narrow field of usefulness.

It is an object of the present invention to provide new plastic containers which have high mechanical resistance and which retain the high mechanical resistance at elevated temperatures so that they can be used safely for holding and transporting hot foods and liquids such as boiling coffee, soups, broths, etc.

A further object is to provide new, thermally insulated plastic containers which can be used safely not only for holding and transporting hot and cold substances such as foods and beverages, but which maintain the hot or cold substances for long periods of time at the temperature at which the substances are introduced into the containers, independently of the external temperature to which the container is exposed after filling and sealing thereof.

These and other objects of the invention are accomplished by providing new plastic Thermos containers comprising alpha-olefine polymerizates consisting prevailingly of isotactic poly(alpha-olefines).

Recently, G. Natta and his co-workers have disclosed (in, e.g., two papers entitled, respectively, "A New Class of Alpha-Olefin Polymers Having Exceptional Uniformity of Structure" and "The Crystalline Structure of a New Type of Polypropylene," which were presented to an open meeting of Accademia Nazionale Dei Lincei on December 11, 1954, and published in the Proceedings of the Accademia on January 29, 1955) wholly new, solid, linear, head-to-tail polymers of the alpha-olefines $$CH_2=CHR$$

where R is a hydrocarbon radical. The new polymers are of two different steric structures by reason of which they are either crystallizable or non-crystallizable.

As Natta et al. have shown, the new sterically different polymers of the same alpha-olefine can be obtained in admixture by polymerizing the alpha-olefine with the aid of a catalyst prepared from a compound, such as a halide, of a transition metal of groups IV to VI of the periodic table and a metallorganic compound of a metal of groups I–III of the periodic table, in a hydrocarbon solvent inert to the catalyst, at atmospheric or only slightly increased pressure, and at a temperature of, for instance, 50° C. to 120° C. The crude polymerizate obtained under the conditions described normally comprises, in varying amounts, the amorphous, non-crystallizable polymers, partially crystallizable polymers, and highly crystallizable polymers and these polymers can be separated, on the basis of their different steric structures, by means of selective solvents.

As Natta et al. have also shown, by using a catalyst prepared from selected components of the type mentioned, it is possible to orient the polymerization of the alpha-olefine so that the polymerizate directly obtained consists prevailingly to substantially of the crystallizable polymer, or prevailingly to substantially of the non-crystallizable polymer. For instance, if the catalyst used is difficultly dispersible in the hydrocarbon solvent used as the polymerization medium, as is the catalyst prepared from triethyl aluminum and a low valency compound of the transition metal such as titanium trichloride, the polymerizate obtained consists prevailingly (over 50%) or substantially of the crystallizable poly (alpha-olefine).

The new crystallizable and non-crystallizabe poymers of the alpha-olefines were called "isotactic" and "atactic" polymers, respectively, by G. Natta. Those terms have been adopted in the art for identifying the stereoisomeric polymers, and are used herein.

The isotactic polymers are linear, head-to-tail polymers made up of macromolecules having substantially stereoregular isotactic structure characterized in that substantially all of the asymmetric tertiary main-chain carbon atoms of adjacent monomeric units of the same chain section have the same steric configuration and the main chain of the macromolecules, if fully extended in a plane, shows substantially all of the R groups attached to the tertiary carbon atoms of the monomeric units of said chain section on one side, of e.g., above, the plane and all of the hydrogen atoms bound to the tertiary carbon atoms of the monomeric units of said chain section on the opposite side, of e.g., below, the plane. A section of the main chain of the isotactic macromolecule in which the R groups are above the hypothetical plane may be followed by a section in which the R groups are below said plane.

The atactic poly (alpha-olefines) are also linear, head-to-tail polymers but consist essentially of macromolecules in which tertiary asymmetric carbon atoms of the main chain having the same steric configuration have substantially a random distribution, and the main chain of the macromolecules, if fully extended in a plane, shows the R groups and the hydrogen atoms bound to the tertiary carbon atoms substantially in random distribution on the two sides of the plane.

The homopolymerizates of the higher alpha-olefins $CH_2=CHR$ according to Natta et al. may consist prevailingly (from over 50% to essentially) of the isotactic homopolymers, i.e., of the homopolymers made up of the isotactic macromolecules.

The plastic containers of the present invention are made from the homopolymerizates which consist prevailingly or essentially of the isotactic homopolymers and more specifically from such polypropylenes, 1-polybutenes, polystyrenes, or mixtures of those polymers.

We find that plastic containers of widely varying shape and size, and resistant to both high and low temperatures, even to temperatures above 100° C. and below −10° C. can be made from the alpha-olefin polymerizates consisting prevailingly of the isotactic polymers or mixtures thereof. In addition to the resistance to high temperatures, the new plastic containers of the invention have high resilience, an aesthetically pleasing appearance, excellent chemical resistance and resistance to change with time even when exposed to conditions which are normally corrosive. The new containers can be sterilized, are very light in weight, and have good insulating capacity. The high thermal insulating property of the container is of particular importance because it contributes to maintenance of hot substances at the temperature at which they are packaged, and also permits the container to be handled even at very low or very high temperatures without the danger to the lips or hands which is a hazard when a metal container is used.

The containers of the invention can be made by various methods using apparatus conventionally used in the working of plastic materials. For instance, the containers may be made by extrusion molding of the poly (alpha-olefine) or mixed poly (alpha-olefines) in the form of tubes followed by sealing of one end of the tube, by injection molding, by blow-molding methods, by drawing or vacuum shaping of pre-formed films, foils or sheets of the polymer, etc.

According to one embodiment of the invention, the container is of the one-wall type, is formed of the alpha-olefin polymerizate consisting prevailingly of the isotactic poly (alpha-olefine), and is provided with top and bottom closures at least the top closure being removable or capable of being opened to permit of dispensing the contents of the container. The top and bottom closures may be obtained by folding the sheet of the polymer from which the container is formed upon itself and heat-sealing the folded portions. At least the top closure may be a permanent or a removable member, i.e., a lid which may comprise at least prevailingly isotactic poly (alpha-olefine) and if permanent may be provided with a suitable filling and pouring spout which is adapted to lie flat against the lid when not in use and can be sealed by means of a strip of a suitable sealing material, e.g., a strip of a thermoplastic resin after the container is filled and during handling and transportation thereof.

The spout may also be integral with the wall of the container and formed by folding the container wall inwardly in the form of a pleat which, when pulled out, provides a filling and pouring spout.

According to another, usually preferred embodiment, the container comprises two members of the same general shape but one of which is smaller than, and adapted to be inserted in the other, to provide a hollow space or cavity between the outer surface of the wall of the smaller member and the inner surface of the wall of the larger member which space may be occupied by an insulating material which further assists in insulating substances packaged in the container against change in the temperature thereof.

At least one of the body-forming members forming the container is made of the alpha-olefin polymerizate consisting prevailingly of the isotactic poly (alpha-olefine) or mixture of the alpha-olefine polymerizates and, usually, the inner body member is formed of said polymers.

The container is provided with a permanent or removable bottom closure which may be obtained by folding the plastic material comprising the two members at one end of the container inwardly and heat-sealing the folded portions. The bottom closure may also be a separate member which is sealed to the container walls in any suitable way. The container is also provided with a removable or permanent top closure which may be a lid adapted to fit the top of the container exactly or to extend beyond the opening. The lid may be provided with a filling or pouring spout which lies flat against the lid when not in use and can be sealed against accidental opening during handling and/or transportation of the container, in any appropriate way. The pouring spout may be integral with the container proper. The closure or lid for the top of the container may be molded from the polymerizate consisting prevailingly of the isotactic poly (alpha-olefines) or it may be a laminated structure comprising a layer of the insulating material sandwiched between and bonded to layers formed from the same materials as the main body members.

Any of the materials normally used for thermal insulation can be disposed between the walls of the container. However, it is generally preferred to use a porous (foamed or cellular) synthetic resin as the insulating material. Such porous resins generally have higher insulating capacity than other known insulating materials and have the further advantages of being readily conformable to the walls of the container and, when thermoplastic, of being capable of forming a strong, autogenous bond with the container walls to insure a mechanically strong, very resistant container which can be re-used.

The insulating synthetic resin may be in the form of a foam which is pre-formed or formed in situ, or in the form of loose pieces of plastic foam floc.

Examples of synthetic resins which, in the foamed or cellular condition, may be used as the insulating material include phenol-formaldehyde and urea-formaldehyde resins, polystyrene, polyurethanes and polyvinyl chloride. However, it is genearlly preferred to use, as the thermal insulating material to be disposed between the walls of the two body members a porous (foamed or cellular) poly (alpha-olefine). The insulating materials formed from the poly (alpha-olefines), which are new in the art, have the same characteristics of high heat, chemical and mechanical resistance, as the polymers from which at least one of the body members is formed, and the use thereof in conjunction with the member or members formed from the polymerizate consisting prevailingly of the isotactic poly (alpha-olefines) makes for an especially desirable assembly adapted to use under a wide range of conditions. The natural affinity which exists between the poly (alpha-olefine) forming at least one wall of the container proper, and the cellular poly (alpha-olefine) constituting the thermal insulation disposed in the cavity between the walls of the two body members facilitates the obtaining of a very strong autogenous sealing of the cellular material to the container walls to provide an exceptionally strong, solid, resistant structure.

The cellular poly (alpha-olefines) can be obtained in any suitable way, for example by mixing the polymer with soluble salts, and then dissolving out the salts under pressure, by incorporating with the polymer substances which evolve a gas under heating and then subjecting the mass to heat and pressure, etc. A foamed poly (alpha-olefine) can be obtained by the usual methods utilizing blowing agents.

In the accompanying drawing—

Figure 2:
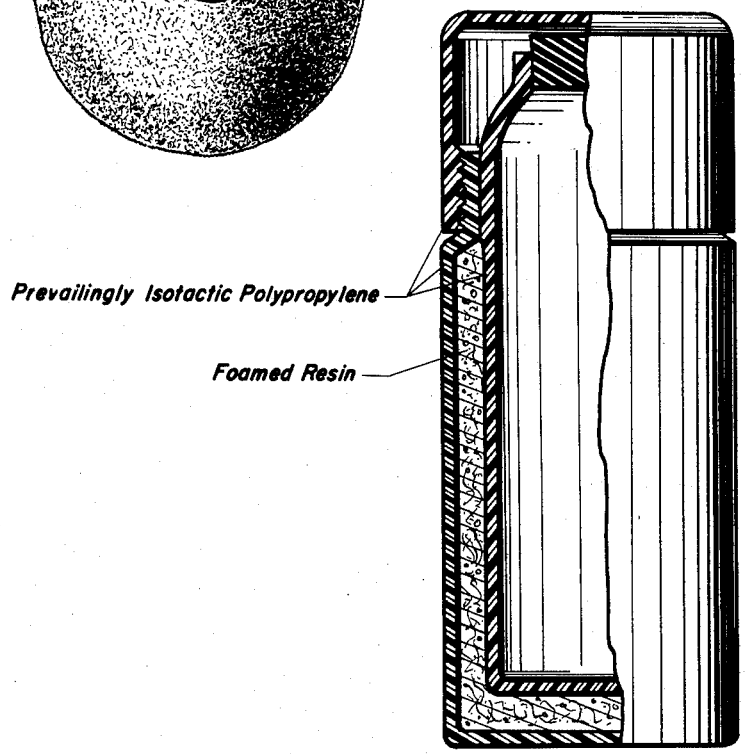

FIGURE 1 is a front plan view, shown partly in section, of one form of container according to the invention; and FIGURE 2 is a front plan view, shown partly in section, of a water bottle made in accordance with the invention; and FIGURE 3 is a flowsheet showing the steps involved in making a water bottle by blow molding of a tube made from a propylene polymerizate consisting prevailingly of isotactic polypropylene.

The following examples are given to illustrate some preferred forms of the containers of the invention, it being understood that these examples are not limitative.

*Example 1*

Using conventional extrusion molding apparatus, prevailing isotactic polypropylene was extruded to obtain a tube having a diameter of 600 mm. and a length of 800 mm. One end of the tube was sealed by means of a disk of the propylene polymer, which constituted a bottom closure for the tube.

The plastic material known commercially as "Kralastic" (a mixture of a copolymer of styrene and acrylonitrile with a copolymer of butadiene and acrylonitrile) was extruded to obtain a second tube which had a diameter of 650 mm. and a length of 850 mm. A disk of the copolymer was sealed to one end of the tube to form a bottom wall or closure therefor.

The smaller polypropylene tube was inserted in the larger copolymer tube, with the sealed ends of the two tubes resting against each other, and so that a hollow space of 25 mm. existed between the outer wall of the inner polypropylene tube and the inner wall of the externally disposed copolymer tube.

A foamed polyurethane known commercially as "Moltopren" was introduced into the hollow space thus providing the container with a light weight and resistant filling of high insulating power.

A cover was made by disposing a layer of the foamed polyurethane "Moltopren" between a circular disk of the polypropylene and a circular disk of the mixed styrene-acrylonitrile and butadiene-acrylonitrile copolymers, and sealing the strata together under heat and pressure. The cover was placed on the open end of the container with the disk formed from the polypropylene adjacent to the container, and sealed to the container.

There was thus obtained a drum having a capacity of about 200 liters, a weight of about 7 kg. and having remarkedly good resistance to mechanical stresses. Liquids and solids introduced into the drum at temperatures varying between —10° C. and 100° C. were retained at the filling temperature for long periods of time.

The tubes used in making the drum can also be obtained by other methods. For example, flat sheets of the respective plastic materials can be wound on rolls of appropriate diameter and sealed along the overlapping edges to obtain the tubes which constitute the two main body members of the drum.

*Example 2*

A mixture of 65 parts of prevailingly isotactic polypropylene and 35 parts of prevailingly isotactic polybutene-1 was injection molded to obtain a container body member having an upward and outward taper such that the upper edge thereof had an outside projection of about 10 mm. width.

Prevailingly isotactic polypropylene was then injection molded to obtain a body member of the same shape but of larger size such that when the first member formed from the mixed polymers was inserted in the polypropylene member a hollow space of about 8 mm. existed between the walls of the members.

Powdered polyethylene (obtained by the low-pressure polymerization of ethylene) was mixed with sodium chloride having the same particle size as the polyethylene, in the proportions of 1.0 part by weight of the polyethylene to 3.0 parts by weight of the sodium chloride. The mixture was molded under heat and pressure to obtain a slab which was immersed in water to dissolve out the sodium chloride and obtain a porous slab of the polyethylene which was inserted in the cavity between the walls of the two assembled body members.

A cover for the assembly was obtained by disposing a piece of the porous solid polyethylene between a disk of the polypropylene-polybutene-1 mixture and a disk of the polypropylene, and sealing the strata together. The diameter of the cover was 3% larger than the diameter of the opening of the container so that the cover extended outwardly and slightly overhung the external container wall.

The final container is very strong, resistant to chemicals, and thermally insulated. It can be used for many purposes, for example as a mess-tin for soldiers, as a food container to be packed and carried by workers, sportsmen, school children, etc. The relative elasticity of the materials used in making the container and the cover, and the fact that the cover is larger than the opening of the container, insured a perfectly tight seal.

*Example 3*

Two tubular body members were injection molded, one of highly isotactic polystyrene (polystyrene consisting essentially of the isotactic macromolecules), and one, somewhat larger in diameter, of a copolymer of styrene and acrylonitrile. The polystyrene member was placed inside the copolymer member. Polystyrene containing blowing agents was placed in the hollow space between the outer wall of the polystyrene member and the inner wall of the copolymer member, and heated by introducing boiling water. After removal of the water the polystyrene contained in the cavity constituted a cellular stratum which was autogenously bonded to the inner surface of the wall of the copolymer member and the outer surface of the polystyrene member.

Insulated containers suitable for handling and transporting foods or warm corrosive liquids are thus obtained.

*Example 4*

Two halves of foamed polyurethane resins were made by conventional methods and joined together to leave a hollow space corresponding in form and size to a water bottle for use by the military, sportsmen, etc.

Using known apparatus and two piece-molds, and introducing one of the plastic foam halves into each piece, the blowing molding of the bottle is carried out starting with a piece of a polypropylene extruded tube.

A container in the form of a water bottle having a strongly adhered outer coating of the plastic foam is thus obtained. The bottle can be provided with an additional outer coating of a high impact resistance material such as polystyrene, if desired.

The water bottle thus obtained is light, very resistant, attractive in appearance, and capable of preserving cold or warm liquids for a long time.

It will be apparent that many variations in the size and shape of the container, as well as in the materials from which it is made, are possible. While one of the body-forming members of the container is made of the alpha-olefin polymerizate consisting prevailingly of the isotactic poly (alpha-olefine) or mixture of those polymers, the other body-forming element may be formed of a different plastic material, as shown in the examples. A wide variety of such other different plastic materials may be used. Also, other types of insulating materials such as cork, glass, rock wool, etc., other pre-formed resins foams, resin foams formed in situ in the cavity, and loose pieces of resin floc may be substituted for the foamed or cellular materials shown specifically.

When mixtures of the polymerizates consisting prevailingly of the isotactic poly (alpha-olefines) are used in making one or both of the body members to be assembled together to form the final container, the polymers may be present in the mixture in equal proportions, or in any predetermined relative proportions.

The containers may be used for substances other than foods (including ice cream), or beverages. For example, they may be used for handling and transporting corrosive liquids of various kinds, medicines, surgical instruments which are to be kept at a predetermined temperature for a long time, and so on.

Since the changes and variations may be made without departing from the spirit of the invention it is intended to include in the scope of the appended claims all such changes as may be apparent to those skilled in this art.

What is claimed is:

1. The method of making a plastic container which comprises forming two halves of a cellular thermoplastic resin, joining the halves to leave a hollow space of predetermined size and shape therebetween, inserting a tube of an alpha-olefin homopolymerizate consisting prevailingly of isotactic homopolymer in the space between the halves, and subjecting said tube to blow molding to force it to conform to the inner walls of the cellular mass and to effect autogenous sealing of the alpha-olefin homopolymerizate directly to the inner walls of the cellular mass.

2. The method according to claim 1, characterized in that the halves are formed of cellular polystyrene and the tube is formed of a propylene polymerizate consisting prevailingly of isotactic polypropylene.

3. As a new article of manufacture, a plastic container comprising a non-cellular inner wall formed of an alpha-olefin homopolymerizate consisting prevailingly of isotactic homopolymer, said homopolymer being selected from the group consisting of polypropylene, polybutene-1 polystyrene and mixtures thereof, and an outer cellular wall of the said alpha-olefin homopolymerizate forming said inner wall, the inner surface of said cellular wall being directly and autogenously bonded to the outer surface of said inner wall, said container having high mechanical strength even at temperatures above 100° C. and below −10° C. and being capable, after filling thereof with liquids or solids at a given temperature between −10° C. and 100° C. and closing thereof, of maintaining the liquid or solid substantially at the filling temperature for long periods of time.

References Cited in the file of this patent

UNITED STATES PATENTS

| | | |
|---|---|---|
| 2,256,483 | Johnston | Sept. 23, 1941 |
| 2,552,641 | Morrison | May 15, 1941 |
| 2,555,538 | Friedman | June 5, 1951 |
| 2,643,021 | Freedman | June 23, 1953 |
| 2,759,617 | Gauthier | Aug. 21, 1956 |
| 2,812,874 | Casalino | Nov. 12, 1957 |
| 2,824,090 | Edwards et al. | Feb. 18, 1958 |
| 2,834,768 | Friedlander | May 13, 1958 |
| 2,840,551 | Field et al. | June 24, 1958 |
| 2,872,766 | Meissner | Feb. 10, 1959 |
| 2,898,972 | Strong | Aug. 11, 1959 |

OTHER REFERENCES

XVI "Journal of Polymer Science," pages 143–154, April 1955.